US008933603B2

(12) United States Patent
Kim (10) Patent No.: US 8,933,603 B2
(45) Date of Patent: Jan. 13, 2015

(54) SPINDLE MOTOR AND MANUFACTURING METHOD THEREOF (75) Inventor: Chanseok Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 742 days.

(21) Appl. No.: 12/981,189

(22) Filed: Dec. 29, 2010

(65) Prior Publication Data

US 2011/0163621 A1 Jul. 7, 2011

(30) Foreign Application Priority Data

Dec. 31, 2009 (KR) ........................ 10-2009-0135338

(51) Int. Cl.
*H02K 1/18* (2006.01)
*H02K 5/16* (2006.01)
*H02K 15/00* (2006.01)
*G11B 19/20* (2006.01)
*H02K 5/167* (2006.01)

(52) U.S. Cl.
CPC ............ *G11B 19/2009* (2013.01); *H02K 1/187* (2013.01); *H02K 5/1675* (2013.01)
USPC .......................................... 310/90; 310/67 R (58) Field of Classification Search
CPC ......... H02K 1/187; H02K 5/163; H02K 1/14; H02K 1/2786
USPC .............. 310/89, 90, 216.132, 216.133, 67 R
See application file for complete search history.

(56) References Cited

U.S. PATENT DOCUMENTS

| 2004/0160135 | A1 | 8/2004 | Horng et al. | |
| 2007/0132326 | A1* | 6/2007 | Kim et al. | 310/90 |
| 2011/0163621 | A1* | 7/2011 | Kim | 310/90 |

FOREIGN PATENT DOCUMENTS

| CN | 1185052 A | 6/1998 | |
| CN | 1202692 A | 12/1998 | |
| CN | 101388587 A | 3/2009 | |
| JP | 10-108442 A | 4/1998 | |
| JP | 11332141 A | * 11/1999 | ............... H02K 1/18 |
| KR | 20-1999-0019787 U | 6/1999 | |
| KR | 10-2004-0078406 A | 9/2004 | |
| KR | 10-2009-0070223 A | 7/2009 | |

OTHER PUBLICATIONS

Machine translation of JP 11332141 A Jul. 2013.*
Office Action dated Jan. 17, 2013 in Chinese Application No. 201010624263.1, filed Dec. 31, 2010.

(Continued)

*Primary Examiner* — Quyen Leung
*Assistant Examiner* — David Scheuermann
(74) *Attorney, Agent, or Firm* — Saliwanchik, Lloyd & Eisenschenk (57) ABSTRACT

A spindle motor is provided, the motor including a bearing assembly including an upper end-opened cylindrical bearing housing and a bearing inserted into the bearing housing and formed with a rotation shaft hole, a stator including a core coupled to a periphery of the bearing housing and formed with at least one core through hole that passes an upper surface and a bottom surface, and a coil wound on the core, a base plate including a floor plate opposite to the bottom surface of the core and a core fixture protruded from the floor plate to be coupled to the core through hole, and a rotor including a rotation shaft coupled to the rotation shaft hole, a yoke coupled to the rotation shaft, and a magnet formed at the yoke in opposition to the core.

10 Claims, 5 Drawing Sheets

(56) References Cited

OTHER PUBLICATIONS

Office Action dated Mar. 25, 2011 in Korean Application No. 10-2009-0135338, filed Dec. 31, 2009.

Office Action dated Oct. 12, 2013 in Chinese Application No. 201010624263.1, filed Dec. 31, 2010.

* cited by examiner

SPINDLE MOTOR AND MANUFACTURING METHOD THEREOF

CROSS-REFERENCE TO RELATED APPLICATION

This application claims the benefit under 35 U.S.C. §119 of Korean Application Number 10-2009-0135338, filed Dec. 31, 2009, which is hereby incorporated by reference in its entirety.

BACKGROUND OF THE DISCLOSURE

Field of the Invention

The present disclosure relates to a spindle motor and a manufacturing method thereof. A spindle motor performs the function of rotating a disk to enable an optical pickup which linearly reciprocates in an optical disk drive (ODD) and a hard disk to read data recorded on the disk.

Spindle motors are widely used in electronic appliances (e.g., a projection television, a home theater device, a drive for a computer, etc.) requiring precisely rotational devices. The spindle motors are small in size and can rotate at high speed. Also, the spindle motors are easy to precisely control and have low power consumption. Because of these advantages, the use of the spindle motors is expected to increase.

The spindle motor is configured in such a manner that an upper end opened bearing housing is peripherally fixed with a core wound with a coil, where the bearing housing is fixed to a base plate formed with a burring part.

Recently, the spindle motor has been gradually slimmed with thickness being subsequently reduced, and as a result, a thin spindle motor has been developed with its thickness of approximately 12.7 mm. On top of that, a thin spindle motor with its thickness of approximately 9.5 mm has been developed of late.

Concomitant with trends of reducing the thickness of spindle motor, height of the spindle motor also decreases to bring about such problems of difficulty in obtaining a sufficient area for coupling a burring part to a bearing housing after a core is coupled to a periphery of the bearing housing, and of the bearing housing being easily detached from the burring part, to name a few.

Another problem is that there frequently occurs an improper assembly of a core, a burring part and a bearing housing due to a manufacturing tolerance between the core, the burring part and the bearing housing if the core and the burring part are simultaneously fixed at the periphery of the bearing housing.

Still another problem is that it is difficult to adjust an angle formed by a rotation shaft rotatably coupled to a bearing inserted into the bearing housing and a base plate if the core and the burring part are simultaneously fixed at the periphery of the bearing housing.

BRIEF SUMMARY

Embodiments provide a spindle motor configured to inhibit an improper assembly caused by a manufacturing tolerance between a core, a bearing housing and a base plate, and an easy detachment of the base plate from the bearing housing, and to adjust an inclination of a rotation shaft relative to the base plate.

Embodiments also provide a manufacturing method of a spindle motor.

In one general aspect of the present disclosure, there is provided a spindle motor, comprising: a bearing assembly including an upper end-opened cylindrical bearing housing and a bearing inserted into the bearing housing and formed with a rotation shaft hole; a stator including a core coupled to a periphery of the bearing housing and formed with at least one core through hole that passes an upper surface and a bottom surface, and a coil wound on the core; a base plate including a floor plate opposite to the bottom surface of the core and a core fixture protruded from the floor plate to be coupled to the core through hole; and a rotor including a rotation shaft coupled to the rotation shaft hole, a yoke coupled to the rotation shaft, and a magnet formed at the yoke in opposition to the core.

In some exemplary embodiments of the present disclosure, at least two core through holes formed at the core may be provided, each spaced at an equidistant interval from the other.

In some exemplary embodiments of the present disclosure, at least two core through holes formed at the core may be provided, each spaced at a different interval from the other.

In some exemplary embodiments of the present disclosure, the core fixture coupled to the core through hole may take one of the shapes including a rectangular parallelepiped plate, a curved plate and a boss shape.

In some exemplary embodiments of the present disclosure, the base plate may be formed with an opening large enough to allow the periphery of the bearing housing to be inserted thereinto.

In some exemplary embodiments of the present disclosure, the core fixture may pass the core through hole to protrude and bend upward of the core.

In another general aspect of the present disclosure, there is provided a spindle motor, comprising: a bearing assembly including an upper end-opened cylindrical bearing housing and a bearing inserted into the bearing housing and formed with a rotation shaft hole; a stator including a core coupled to a periphery of the bearing housing and formed with at least one core through hole that passes an upper surface and a bottom surface, and a coil wound on the core; a base plate including a core fixture formed with a first core fixture protruded from a floor plate opposite to the bottom surface, a second core fixture bent from the first core fixture to support the bottom surface, and a third core fixture bent from the second core fixture to be coupled with the core through hole; and a rotor including a rotation shaft coupled to the rotation shaft hole, a yoke coupled to the rotation shaft, and a magnet formed at the yoke in opposition to the core.

In some exemplary embodiments of the present disclosure, the first core fixture may be perpendicularly protruded from the floor plate, and the third core fixture may be bent in parallel with the first core fixture.

In some exemplary embodiments of the present disclosure, the third core fixture may pass the core through hole to protrude and bend from the upper surface of the core.

In still another general aspect of the present disclosure, there is provided a spindle motor, comprising: a bearing assembly including an upper end-opened cylindrical bearing housing and a bearing inserted into the bearing housing and formed with a rotation shaft hole; a stator including a core coupled to a periphery of the bearing housing and formed with at least one core through hole that passes an upper surface and a bottom surface, and a coil wound on the core; a base plate including a first core fixture formed with a size larger than that of the core through hole to support the bottom surface of the core, and a second core fixture protruded from an upper surface of the first core fixture to be coupled to the core through hole; and a rotor including a rotation shaft coupled to the rotation shaft hole, a yoke coupled to the rotation shaft, and a magnet formed at the yoke in opposition to the core.

In some exemplary embodiments of the present disclosure, the second core fixture may pass the core to protrude and bend from an upper surface of the core.

In still further aspect of the present disclosure, a manufacturing method of a spindle motor, comprising: inserting a bearing formed with a rotation shaft hole into an upper end-opened cylindrical bearing housing to assemble a bearing assembly; coupling a stator including a coil wound on a core formed with at least one core through hole that passes an upper surface and a bottom surface to a periphery of the bearing housing; coupling a floor plate of a base plate opposite to the bottom surface of the core and a core fixture protruded from the floor plate to the core through hole; and coupling a rotation shaft including a yoke and a magnet formed at the yoke in opposition to the core, to the hearing.

In some exemplary embodiments of the present disclosure, a plurality of core through holes may be formed at the core, each spaced at an equidistant interval from the other.

In some exemplary embodiments of the present disclosure, the core fixture may be formed at a position opposite to that of the core through hole.

In some exemplary embodiments of the present disclosure, the core fixture may take the shape of either a flat plate shape or a curved plate.

In some exemplary embodiments of the present disclosure, the core fixture may include a first core fixture protruded from the floor plate, a second core fixture bent from the first core fixture to support the bottom surface, and a third core fixture bent from the second core fixture to be coupled with the core through hole.

In some exemplary embodiments of the present disclosure, the core fixture may include a first core fixture formed with a size larger than that of the core through hole to support the bottom surface of the core, and a second core fixture protruded from an upper surface of the first core fixture to be coupled to the core through hole.

In some exemplary embodiments of the present disclosure, a distal end of the core fixture may be bent in parallel with the upper surface of the core.

In some exemplary embodiments of the present disclosure, the method may further include, subsequent to inserting the rotation shaft to the bearing, fixing the periphery of the bearing housing an angle adjustment jig, and adjusting an angle formed by the rotation shaft and the base plate using the angle adjustment jig.

In some exemplary embodiments of the present disclosure, the angle adjustment jig may be inserted into a space formed by the periphery of the bearing housing and the core fixture.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

Figure 1:
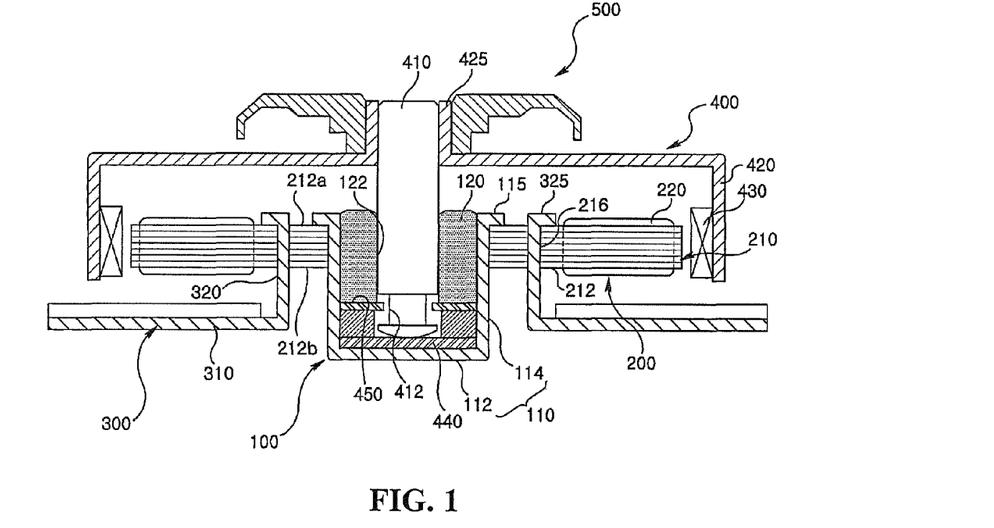
FIG. 1 is a cross-sectional view of a spindle motor according to an exemplary embodiment of the present disclosure.

FIG. 1 is a cross-sectional view of a spindle motor according to an exemplary embodiment of the present disclosure.

Referring to FIG. 1, a spindle motor 500 may include a bearing assembly 100, a stator 200, a base plate 300 and a rotor 400. The bearing assembly 100 may include a bearing housing 110 and a bearing 120. The bearing housing 110 may take the shape of an upper end-opened cylinder. The hearing housing 110 may include a floor plate 112 and a lateral plate 114 extended from an edge of the floor plate 112. The lateral plate 114 may be formed at an upper surface thereof with a flange unit 115 for fixing the stator (200. described later).

The bearing 120 is mounted inside the bearing housing 110, and takes the shape of a cylinder formed with a rotation shaft hole 122. The bearing 120 may include an oil impregnation sintering bearing for rotating a rotation shaft (described later) at a high speed. The stator 200 may include a core 210 and a coil 220.

Figure 2:
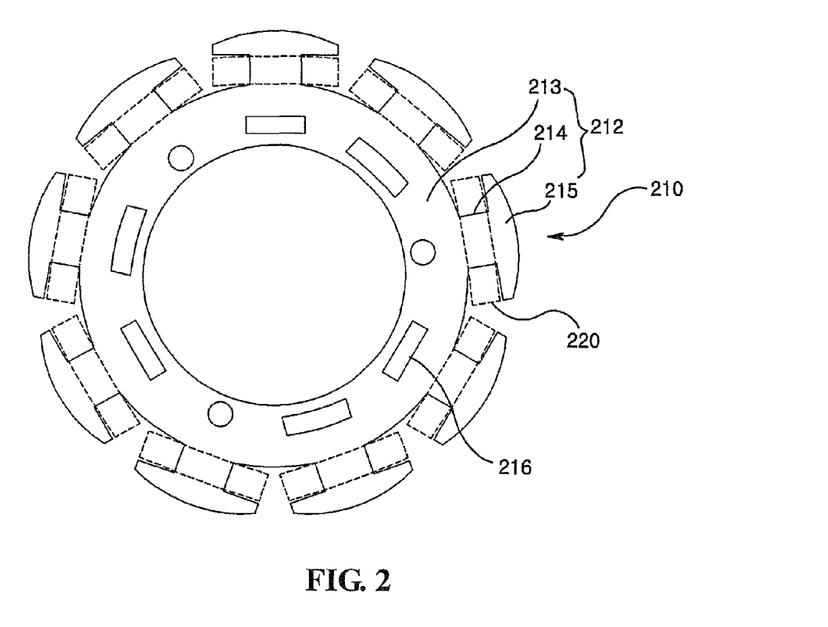
FIG. 2 is a plan view of a core at a stator illustrated in FIG. 1.

FIG. 2 is a plan view of a core at a stator illustrated in FIG. 1.

Referring to FIG. 2, the core 210 may include a core body 212 and at least one core through hole 216. The core body 212 may include a body unit 213, a protrusion 214 and a salient pole portion 215. The body unit 213 may take the shape of a ring when viewed on a plain surface, and the protrusion 214 may be radially protruded from a periphery of the body unit 213 and the salient pole portion 215 may be formed at a distal end of the protrusion 214.

The core through hole 216 may be formed at the body unit 213, and passes an upper surface 212a of the core body 212 of FIG. 1 and a bottom surface 212b opposite to the upper surface 212a.

In the present exemplary embodiment, at least one core through hole 216 may be formed at the body unit 213 of the core body 212. The core through hole 216 may take one of various shapes, such as a circle, a triangle, a square, a rectangle, a polygon and a curved slit. Furthermore, the core body 212 may be formed with at least two core through holes 216, and the plurality of core through holes 216 may be arranged on the body unit 213 at an equidistant interval. Alternatively, each of the core through holes 216 may be also arranged at a different interval.

The coil 220 is wound on each periphery of the protrusion 214 of the core body 212 of FIG. 2. An electromagnetic field can be generated from the coil 220 responsive to a current applied to the coil 220 wound about the protrusion 214.

Figure 3:
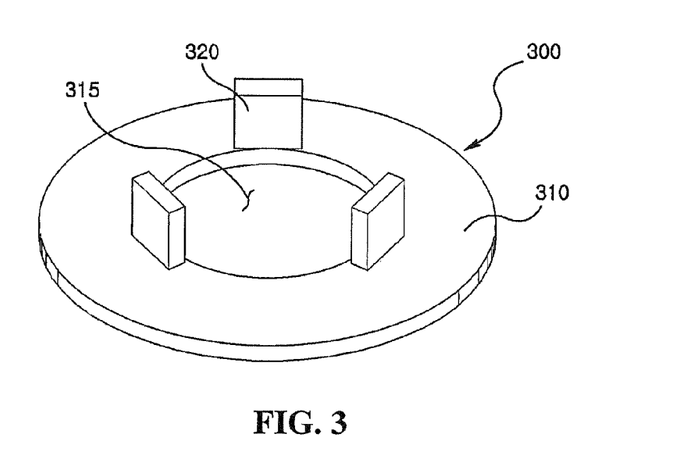
FIG. 3 is a perspective view illustrating a base plate of FIG. 1.

FIG. 3 is a perspective view illustrating a base plate of FIG. 1.

Referring to FIGS. 1 and 3, the base plate 300 may include a floor plate 310 and a core fixture 320. The floor plate 310 may, for instance, take the shape of a disk, and be centrally formed with an opening 315. In the present exemplary embodiment, the opening 315 has a diameter greater than that of the bearing housing 110, whereby a gap is formed between a periphery of the lateral plate 114 of the bearing housing 110 and an inner lateral surface of the floor plate 310 formed by the opening 315 of the floor plate 310.

The core fixture 320 may be arranged on an upper surface of the floor plate 310. The core fixture 320 may be perpendicularly arranged relative to the upper surface of the floor plate 310. The core fixture 320 may be formed by protruding from the floor plate 310 or by bending a part of the floor plate and by bending a bender.

In the present exemplary embodiment, the core fixture 320 may be arranged at a place opposite to the core through hole 216 formed at the body unit 213 of the core body 210 of FIG. 2, and the core fixture 320 may be coupled to the core through hole 216. For example, the core fixture 320 may be press-fitted into the core through hole 216. Furthermore, an adhesive may be interposed between the core fixture 320 and the core through hole 216 to reinforce or increase the coupling force between the core fixture 320 and the body unit 213 of the core body 210.

In the present exemplary embodiment, the core fixture 320 perpendicularly arranged relative to the floor plate 310 may be formed in the shape of a rectangular parallelepiped, for example.

Figure 4:
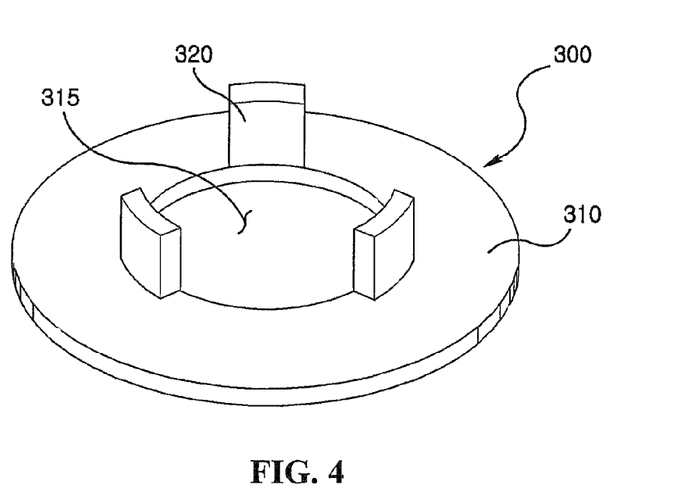
FIGS. 4 and 5 are perspective views illustrating a base plate according to another exemplary embodiment of the present disclosure.
Figure 5:
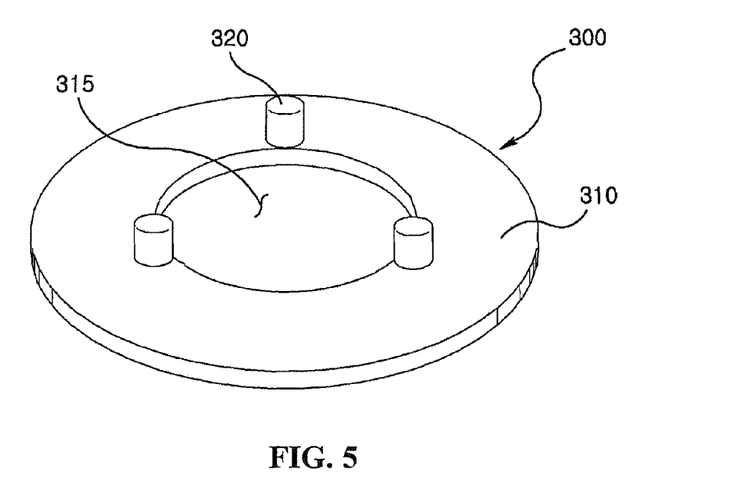

FIGS. 4 and 5 are perspective views illustrating a base plate according to another exemplary embodiment of the present disclosure.

The core fixture 320 protruded from the floor plate 310 of the base plate 300 may take the shape of a curved plate, as shown in FIG. 4. The core fixture 320 of a curved plate may be substantially formed with the same curvature as that of the opening formed at the floor plate 310. Meanwhile, the core fixture 320 protruded from the floor plate 310 of the base plate 300 may take the shape of a pin or a boss as illustrated in FIG. 5.

Referring back to FIG. 1, the core fixture 320 protruded from the floor plate 310 of the base plate 300 may include a bending unit 325. The bending unit 325 may be formed by bending a portion protruded at a predetermined length from the upper surface 212a of the body unit 213 at the core body 212 to an upper surface 212a of the body unit 213 at the core body 212.

Referring again to FIG. 1, the rotor 400 may include a rotation shaft 410, a yoke 420 and a magnet 430.

The rotation shaft 410 may be rotatably arranged inside the rotation shaft hole 122 of the bearing 120. The rotation shaft 410 may formed at a bottom end thereof with a shaft groove 412 in which a washer 450 is arranged for inhibiting the rotation shaft from floating according to rotation of the rotation shaft 410 inside the shaft groove 412, and may be arranged at a bottom end thereof with a thrust bearing 440.

The yoke 420 may take the shape of a disk, and may be centrally formed with a yoke burring portion 425 that is in turn coupled to the rotation shaft 410. The magnet 430 may be arranged at an inner surface of the yoke 420 so bent as to face a distal end of the core 210.

In the present exemplary embodiment, the core fixture 320 of the base plate 300 is coupled to each core through hole 216 that passes the upper surface 212a and the bottom surface 212b of the core 210 to allow the base plate 300 to be securely coupled to the core 210 regardless of the length of the lateral plate 114 of the bearing housing 110.

Furthermore, the bearing housing 110 can be assembled to the base plate 300 regardless of a manufacturing tolerance of the burring portion of the base plate 300 by fixing the base plate 300 to the core 210.

Figure 6:
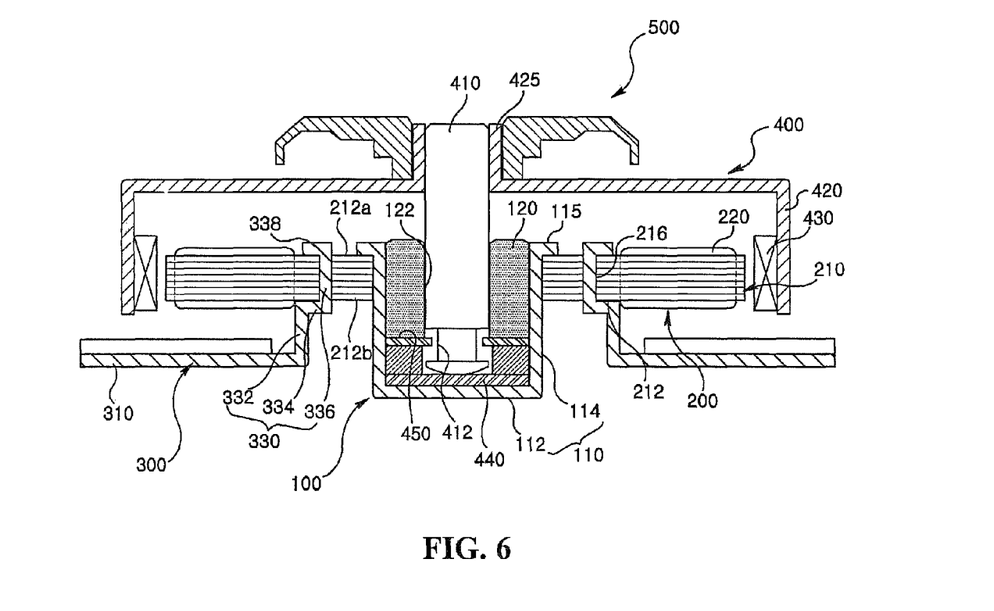
FIG. 6 is a cross-sectional view illustrating a spindle motor according to another exemplary embodiment of the present disclosure.
Figure 7:
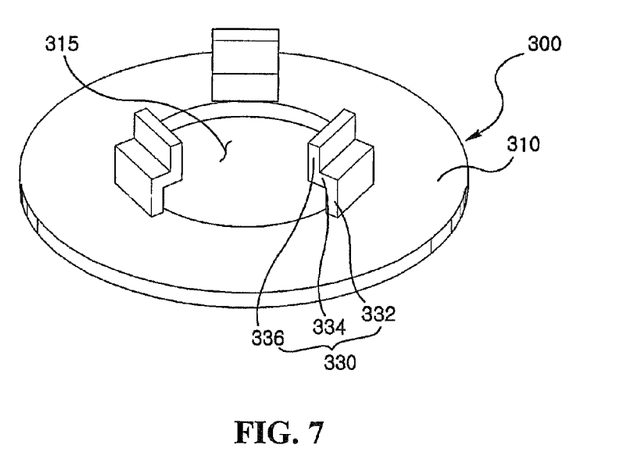
FIG. 7 is a perspective view illustrating a base plate of FIG. 6.

FIG. 6 is a cross-sectional view illustrating a spindle motor according to another exemplary embodiment of the present disclosure and FIG. 7 is a perspective view illustrating a base plate of FIG. 6.

Configuration of a spindle motor according to another exemplary embodiment of the present disclosure is substantially equal to that of the spindle motor of FIG. 1, except for the base plate. Therefore, no redundant explanation will be provided for the same elements, and like reference numerals refer to like elements.

Referring to FIGS. 6 and 7, a spindle motor 500 may include a bearing assembly 100, a stator 200, a base plate 300 and a rotor 400.

The base plate 300 may include a floor plate 310 and a core fixture 320. The floor plate 310 may, for instance, take the shape of a disk, and be centrally formed with an opening 315. In the present exemplary embodiment, the opening 315 has a diameter greater than that of the bearing housing 110, whereby a gap is formed between a lateral plate 114 of the bearing housing 110 and a core fixture 330 formed at the floor plate 310.

The core fixture 330 may be arranged on an upper surface of the floor plate 310. The core fixture 330 may include a first core fixture 332, a second core fixture 334 and a third core fixture 336. In addition, the core fixture 330 may further include a bending unit 338 formed on an upper surface of the third core fixture 336. The first core fixture 332 may be perpendicularly arranged relative to the upper surface of the floor plate 310.

The second core fixture 334 may be bent from the first core fixture 332 in parallel with a bottom surface 212b of a core body 212. The second core fixture 334 supports the core body 212 of a core 210. The third core fixture 336 may be bent from the second core fixture 334, and the third core fixture 336 may be coupled to a core through hole 216 formed at the core body 212. The third core fixture 336 may be arranged in parallel with the first core fixture 332. The third core fixture 336 may be press-fitted into the core through hole 216, or may be coupled to the core through hole 216 by way of an adhesive.

Meanwhile, the third core fixture 336 may be protruded from the upper surface 212a of the core body 212, or may include a bending unit 338 that is bent from the upper surface 212a of the core body 212, for example. Alternatively, a distal end of the third core fixture 336 may not be protruded from the upper surface 212a of the core body 212.

The core 210 may be fixed by the bending unit 338 and the second cord fixture 334. In the present exemplary embodiment, the base plate 300 can be securely coupled to the core 210 even if the length of the lateral plate 114 at the bearing housing 110 is short, by using the core fixture 330 which is formed by bending the core 210 at least twice.

Furthermore, the bearing housing 110, the core 210 and the base plate 300 can be securely assembled regardless of a manufacturing tolerance of the burring portion of the bearing housing 110 by fixing the base plate 300 to the core 210.

Figure 8:
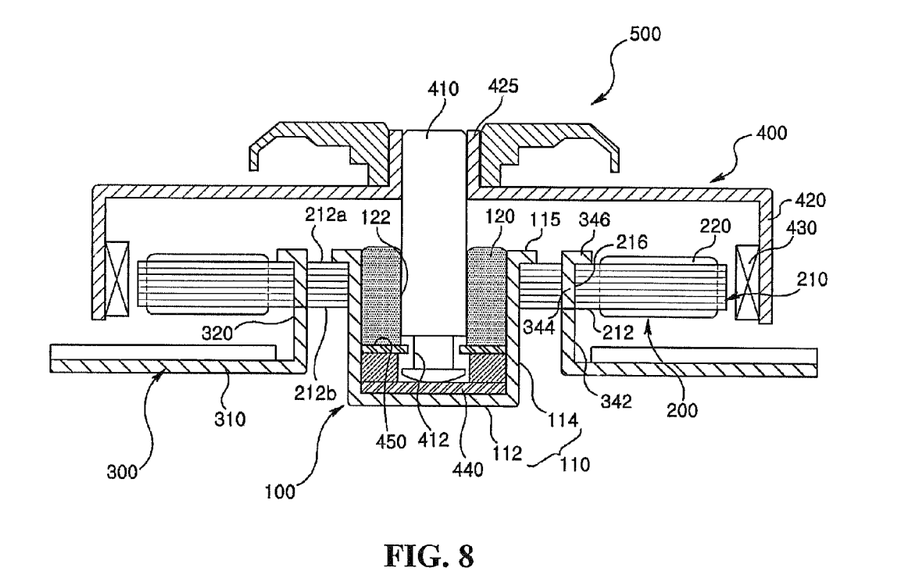
FIG. 8 is a cross-sectional view illustrating a spindle motor according to still another exemplary embodiment of the present disclosure.
Figure 9:
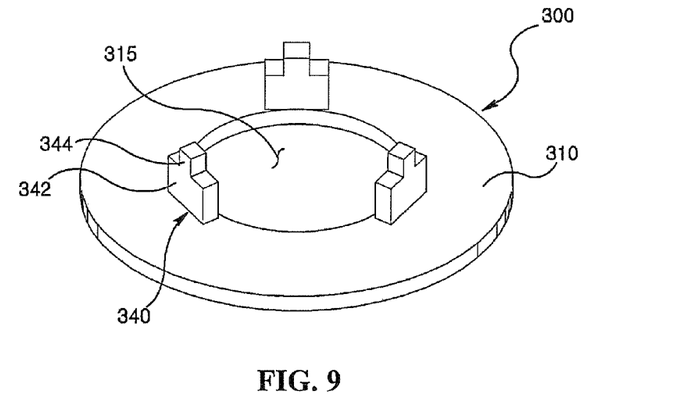
FIG. 9 is a perspective view illustrating a base plate of FIG. 8.

FIG. 8 is a cross-sectional view illustrating a spindle motor according to still another exemplary embodiment of the present disclosure, and FIG. 9 is a perspective view illustrating a base plate of FIG. 8.

Configuration of a spindle motor according to still another exemplary embodiment of the present disclosure is substantially equal to that of the spindle motor of FIG. 1, except for the base plate. Therefore, no redundant explanation will be provided for the same elements, and like reference numerals refer to like elements.

Referring to FIGS. 8 and 9, a spindle motor 500 may include a bearing assembly 100, a stator 200, a base plate 300 and a rotor 400. The base plate 300 may include a floor plate 310 and a core fixture 340.

The floor plate 310 may, for instance, take the shape of a disk, and be centrally formed with an opening 315. In the present exemplary embodiment, the opening 315 has a diameter greater than that of the bearing housing 110, whereby a gap is formed between a lateral plate 114 of the bearing housing 110 and a core fixture 340 formed at the floor plate 310.

The core fixture 340 may be arranged on an upper surface of the floor plate 310. The core fixture 340 may include a first core fixture 342 and a second core fixture 344. In addition, the core fixture 340 may further include a bending unit 346 formed on an upper surface of the second core fixture 344. The first core fixture 342 may be perpendicularly arranged relative to the upper surface of the floor plate 310.

In the present exemplary embodiment, the first core fixture 342 is formed with an area greater than that of the core through hole 216 of the core body 212 at the core 210, whereby the first cord fixture 342 can support the bottom surface 212b of the core body 210.

The second core fixture 344 may be protruded from the first core fixture 342, and has the shape and size capable of being inserted into the core through hole 216 of the core body 212 at the core 210. The second core fixture 344 may be inserted into the core through hole 216 and coupled to the core body 212 by way of an adhesive.

A distal end of the second core fixture 334 may be protruded from the upper surface 212a of the core body 212, or may include a bending unit 346 that is bent from the upper surface 212a of the core body 212, for example. Alternatively, a distal end of the second core fixture 344 may not be protruded from the upper surface 212a of the core body 212.

In the present exemplary embodiment, the bottom surface 212b of the core body 212 at the core 210 can be supported by using the first core fixture 342 of the core fixture 330 having a different area, and the base plate 300 can be securely coupled to the core 210 even if the length of the lateral plate 114 at the bearing housing 110 is short, by coupling the second core fixture 344 to the core through hole 216 of the core body 212.

Furthermore, the bearing housing 110, the core 210 and the base plate 300 can be securely assembled regardless of a manufacturing tolerance of the burring portion of the bearing housing 110 by fixing the base plate 300 to the core 210.

Figure 10:
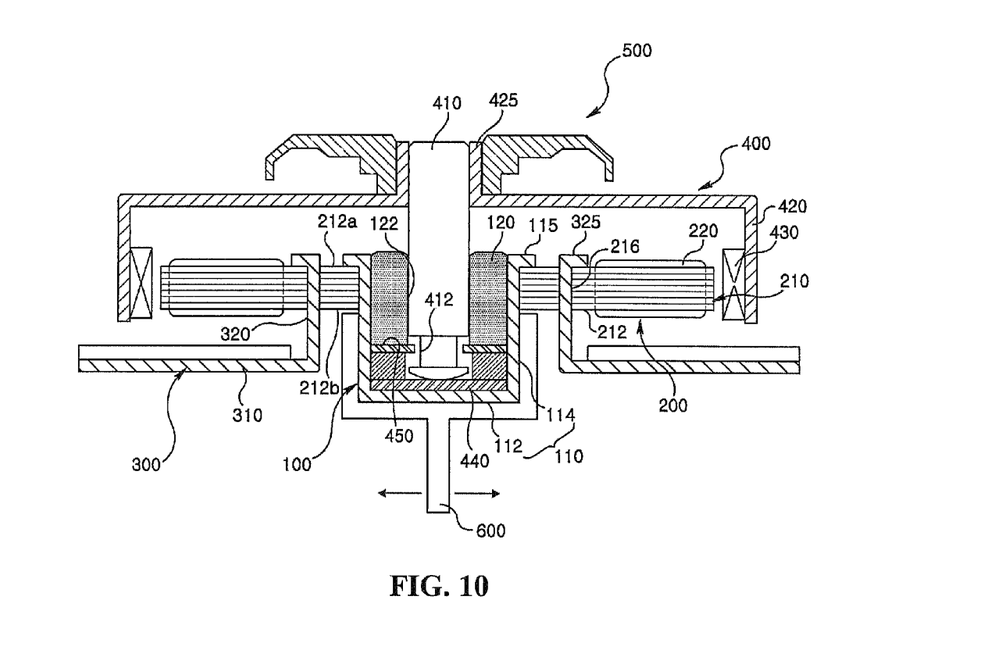
FIG. 10 is a cross-sectional view illustrating a manufacturing method of a spindle motor according to an exemplary embodiment of the present disclosure.

FIG. 10 is a cross-sectional view illustrating a manufacturing method of a spindle motor according to an exemplary embodiment of the present disclosure.

Referring to FIG. 10, a bearing 120 formed with a rotation shaft hole 122 is inserted into an upper end-opened cylindrical bearing housing 110 to assemble a bearing assembly. Successively, a stator, including a core body 212 formed on at least one core through hole that passes an upper surface 212a and a bottom surface 212b, and a coil 220 wound on the core body 212, to a periphery of the bearing housing 110.

Then, as shown in FIG. 3, a core fixture 320 protruded from the floor plate 310 formed with an opening 315 larger than the bearing housing 110 is coupled to the core through hole 216. A rotation shaft 410 coupled by a yoke 420 formed with a magnet opposite to the core 210 is coupled to the rotation shaft hole 122, after the core fixture 320 is coupled to the core through hole 216.

Successively, in a case the rotation shaft 410 is slantingly arranged, the periphery of the bearing housing 110 exposed through the opening 315 of the base plate 300 is fixed by an angle adjustment jig 600, and an inclination of the rotation shaft 410 is adjusted by using the angle adjustment jig 600.

In the manufacturing method of a spindle motor according to an exemplary embodiment of the present disclosure, the base plate 300 may include, as depicted in FIG. 6, a core fixture 330 which in turn includes a first core fixture 332 protruded from the floor plate 310, a second core fixture 334 bent from the first core fixture 332 to support the bottom surface 212h, and a third core fixture 336 bent from the second core fixture 334 to be coupled to the core through hole 216.

In the manufacturing method of a spindle motor according to an exemplary embodiment of the present disclosure, the base plate 300 may include, as shown in FIG. 8, a core fixture 340 which in turn includes a first core fixture 342 formed in a larger size that that of the core through hole 216 to support the bottom surface 212b of the core body 212, and a second core fixture 344 protruded from the upper surface of the first core fixture 342 in a smaller area than that of the first core fixture 342 to be coupled to the core through hole 216.

According to the manufacturing method of a spindle motor according to an exemplary embodiment of the present disclosure, as shown in FIGS. 1, 6 and 8, a core fixture 320 protruded from the upper surface 212a of the core body 212 is bent to contact the upper surface 212a of the core body 212.

As apparent from the foregoing, the base plate can be securely fixed by coupling the bearing housing to the core only which is the stator, forming the core through hole at the core, and forming the core fixture coupled to the core through hole at the base plate, even if height of the bearing housing is low, whereby a secure assembly can be realized even if there occurs a manufacturing tolerance at the bearing housing, the core and the base plate. Furthermore, even if the rotation shaft accommodated in the bearing housing is slanted, the inclination of the rotation shaft can be easily adjusted using a jig.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor, comprising:
   a bearing assembly including an upper end-opened cylindrical bearing housing and a bearing inserted into the bearing housing and formed with a rotation shaft hole;
   a stator including a core coupled to a periphery of the bearing housing and formed with at least one core through hole that passes an upper surface and a bottom surface, and a coil wound on the core;
   a base plate including a floor plate opposite to the bottom surface of the core and a core fixture protruded from the floor plate to be coupled to the core through hole, wherein an opening is formed in a center of the floor plate and a diameter of the opening is greater than an outermost diameter of the bearing housing such that a gap is formed between a lateral surface of the bearing housing and a lateral surface of the core fixture formed at the floor plate; and
   a rotor including a rotation shaft coupled to the rotation shaft hole, a yoke coupled to the rotation shaft, and a magnet formed at the yoke in opposition to the core.

2. The spindle motor of claim 1, wherein at least two core through holes formed at the core are provided, each spaced at an equidistant interval from the other.

3. The spindle motor of claim 1, wherein at least two core through holes formed at the core are provided, each spaced at a different interval from the other.

4. The spindle motor of claim 1, wherein the core fixture coupled to the core through hole takes one of the shapes including a rectangular parallelepiped plate, a curved plate and a boss shape.

5. The spindle motor of claim 1, wherein the core fixture passes the core through hole to protrude and bend upward of the core.

6. A spindle motor, comprising:
   a bearing assembly including an upper end-opened cylindrical bearing housing and a bearing inserted into the bearing housing and formed with a rotation shaft hole;
   a stator including a core coupled to a periphery of the bearing housing and formed with at least one core through hole that passes an upper surface and a bottom surface, and a coil wound on the core;
   a base plate including a core fixture formed with a first core fixture protruded from a floor plate opposite to the bottom surface, a second core fixture bent from the first core fixture to support the bottom surface, and a third core fixture bent from the second core fixture to be coupled with the core through hole; and
   a rotor including a rotation shaft coupled to the rotation shaft hole, a yoke coupled to the rotation shaft, and a magnet formed at the yoke in opposition to the core.

7. The spindle motor of claim 6, wherein the first core fixture is perpendicularly protruded from the floor plate, and the third core fixture is bent in parallel with the first core fixture.

8. The spindle motor of claim 6, wherein the third core fixture passes the core through hole to protrude and bend from the upper surface of the core.

9. A spindle motor, comprising:
   a bearing assembly including an upper end-opened cylindrical bearing housing and a bearing inserted into the bearing housing and formed with a rotation shaft hole;
   a stator including a core coupled to a periphery of the bearing housing and formed with at least one core through hole that passes an upper surface and a bottom surface, and a coil wound on the core;
   a base plate including a floor plate, a first core fixture formed with a size larger than that of the core through hole to support the bottom surface of the core, and a second core fixture protruded from an upper surface of the first core fixture to be coupled to the core through hole, wherein an opening is formed in a center of the floor plate and a diameter of the opening is greater than an outermost diameter of the bearing housing such that a gap is formed between a lateral surface of the bearing housing and a lateral surface of the first core fixture or the second core fixture formed at the floor plate; and
   a rotor including a rotation shaft coupled to the rotation shaft hole, a yoke coupled to the rotation shaft, and a magnet formed at the yoke in opposition to the core.

10. The spindle motor of claim 9, wherein the second core fixture passes the core to protrude and bend from an upper surface of the core.

* * * * *